US 9,538,151 B2

(12) United States Patent
Fukuda et al.

(10) Patent No.: US 9,538,151 B2
(45) Date of Patent: Jan. 3, 2017

(54) VIDEO PROCESSING APPARATUS AND PROJECTOR APPARATUS APPLYING THE SAME THEREIN

(71) Applicant: Hitachi Maxell, Ltd., Osaka (JP)

(72) Inventors: Nobuhiro Fukuda, Tokyo (JP); Mitsuo Nakajima, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 22 days.

(21) Appl. No.: 14/603,670

(22) Filed: Jan. 23, 2015

(65) Prior Publication Data

US 2015/0281663 A1 Oct. 1, 2015

(30) Foreign Application Priority Data

Mar. 27, 2014 (JP) .................................. 2014-066378

(51) Int. Cl.
*H04N 9/31* (2006.01)
*G03B 21/20* (2006.01)
*G06T 5/00* (2006.01)
*G06T 5/20* (2006.01)

(52) U.S. Cl.
CPC ........ *H04N 9/3188* (2013.01); *G03B 21/2053* (2013.01); *G06T 5/001* (2013.01); *G06T 5/003* (2013.01); *G06T 5/008* (2013.01); *G06T 5/20* (2013.01)

(58) Field of Classification Search
CPC ..... G03B 21/00; G03B 21/20; G03B 21/2033; G03B 21/53; G06T 5/002; G06T 5/008; G06T 5/20; G06T 5/001; G06T 5/003
See application file for complete search history.

(56) References Cited

U.S. PATENT DOCUMENTS

| 9,349,153 B2* | 5/2016 | Reed ..................... G06T 1/0064 |
| 2004/0091164 A1* | 5/2004 | Sakatani ................... G06T 5/20 382/254 |
| 2005/0110882 A1* | 5/2005 | Fukuda ..................... G06T 3/40 348/234 |

(Continued)

FOREIGN PATENT DOCUMENTS

| JP | 2011-77971 | 4/2011 |
| JP | 2013-47935 A | 3/2013 |

OTHER PUBLICATIONS

Extended European Search Report received in corresponding European Application No. 15151844.6 dated Jan. 14, 2016.

*Primary Examiner* — Sultan Chowdhury
(74) *Attorney, Agent, or Firm* — Mattingly & Malur, PC

(57) ABSTRACT

The video processing apparatus includes: an input portion, which is configured to input a input video signal therein; and a video correcting portion, which is configured to correct the input video signal, wherein the video correcting portion is constructed to conduct a part of a Retinex process and a part of resolution restoration (deconvolution) by a circuit for common use, and further wherein the Retinex process is conducted upon basis of a result of calculation, applying a first output obtained by applying a mirror reflection component (specular) filter onto the input video signal, a second output obtained by applying a diffuse reflection component (diffuse component) filter onto the input video signal, and a third output obtained by applying an ambient light component (ambient component) filter onto the input video signal.

11 Claims, 16 Drawing Sheets

(56) References Cited

U.S. PATENT DOCUMENTS

| | | | |
|---|---|---|---|
| 2007/0035706 A1* | 2/2007 | Margulis | G03B 21/00 353/122 |
| 2009/0179999 A1* | 7/2009 | Albu | G06T 3/4053 348/222.1 |
| 2011/0080523 A1 | 4/2011 | Suzuki | |
| 2014/0002503 A1 | 1/2014 | Saigo | |

* cited by examiner

VIDEO PROCESSING APPARATUS AND PROJECTOR APPARATUS APPLYING THE SAME THEREIN

This application relates to and claims priority from Japanese Patent Applications No. 2014-066378 filed on Mar. 27, 2014, the entire disclosure of which is incorporated herein by reference.

BACKGROUND OF THE INVENTION

The present invention relates to a video processing apparatus for the purpose of an improvement of visibility for the video or picture, an entire or a part of which is low in the visibility thereof, and in particular, it relates to a video processing apparatus and a projector apparatus applying the same therein, for conducting a preferable video correction upon a projection surface thereof.

In recent years, progress is made on small-sizing of the projector, and with this small-sizing, the projector, being used to be normally installed, fixedly, within an audiovisual room or a hole, etc., for example, for projecting the video on a screen, can be portably carried with; therefore, it can be freely carried with, and installed there. As a way of use of such portable-type projector, since there is further added a business need, i.e., projecting the video, easily or readily, in a conference hall or a meeting room, etc., with using a white board or a wall surface thereof; i.e., using scene of the projector come to be diversified.

However, as a background technology of the present invention is already known the following Patent Document. Thus, in that Patent Document 1 is disclosed a technology for reducing geometrical fuzz or diffuse generated due to enlarging/contracting operation when conducting keystone correction, by means of sharpness processing.

[Patent Document 1] Japanese Patent Laying-Open No. 2011-77971

BRIEF SUMMARY OF THE INVENTION

Herein, for the portable projector, since the install position thereof can be changed, freely, there are brought about problems on the picture quality of the video, which is projected thereby.

Namely, as one of those problems is a positional relationship between the projector and the projection surface.

This is that, with the projector, in particular, when projecting a video from the projector on a screen, et., the light rays projecting on the projection surface, vertically, in other words, the video, projecting in vertical to the optical axis of the projector, in general, comes to a rectangle picture; however, the video projecting with addition of an angle of elevation is distorted into a trapezoid.

Then, the projector conducts a geometrical conversion, being so-called a trapezoidal distortion correction (or, the keystone correction), thereby correcting the projected video from the trapezoid picture into the rectangular picture. In that instance, there is generated a problem that the resolution is deteriorated depending on each position of the picture, and therefore, there is generated the so-called fuzz or diffuse, in a part thereof.

However, the geometrical conversion when conducting the keystone correction mentioned above, since this also changes the light flux per a unit of area, being illuminated from the projector onto the projection surface, then this results to give an ill influence upon contrast of the picture projected. As a result thereof, in particular, on the picture, which is projected by adding the angle of elevation thereto, for example, there is brought about a problem that the contrast is lowered down in an upper portion of the picture.

Or, installation of the technology for reducing the fuzz and also increasing the contrast results to be large in the scale of a circuit; this brings about a problem not preferable for the portable projector, i.e., increasing a const thereof and also giving an ill influence upon designing of small-sizing of the substrate thereof.

The present invention is accomplished by taking the problem of the conventional technology mentioned above into the consideration, in more details thereof, and an object thereof is to provide a video processing apparatus and a projector applying the same therein, for suppressing the diffuse and preventing the contrast from being lowered down, preferably.

For the purpose of accomplishing the object mentioned above, according to the present invention, there is provided a video processing apparatus, comprising: an input portion, which is configured to input a input video signal therein; and a video correcting portion, which is configured to correct said input video signal, wherein said video correcting portion is constructed to conduct a part of a Retinex process and a part of resolution restoration (deconvolution) by a circuit for common use. In such structure, it is preferable that said Retinex process is conducted upon basis of a result of calculation, applying a first output obtained by applying a mirror reflection component (specular) filter onto the input video signal, a second output obtained by applying a diffuse reflection component (diffuse component) filter onto the input video signal, and a third output obtained by applying an ambient light component (ambient component) filter onto the input video signal, in the structure thereof, and that said resolution restoration (deconvolution) is conducted by a calculating process upon basis of at least said first output and said second output.

Also, according to the present invention, there is provided a projector apparatus, comprising: a light source; a video processing apparatus; a video displaying apparatus, which is configured to produce and project a picture upon basis of a display control signal from said video processing apparatus, wherein said video processing apparatus is the video processing apparatus as described in the above; a keystone correction by said projector is conducted within said Retinex process and said deconvolution process, and correction intensities in said Retinex process and said deconvolution process are adjusted, depending on a video geometric conversion made by said keystone correction.

According to the present invention, there can be provided a video processing apparatus, for enabling to implement the Retinex process and the deconvolution process, at the same time, thereby improving the visibility, in the form of a small-scale circuit, and also there is provided the video displaying apparatus for suppressing the diffuse and lowering of the contrast, preferably, with applying that video processing apparatus therein, in the geometric conversion by means of the keystone correction.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Figure 1:
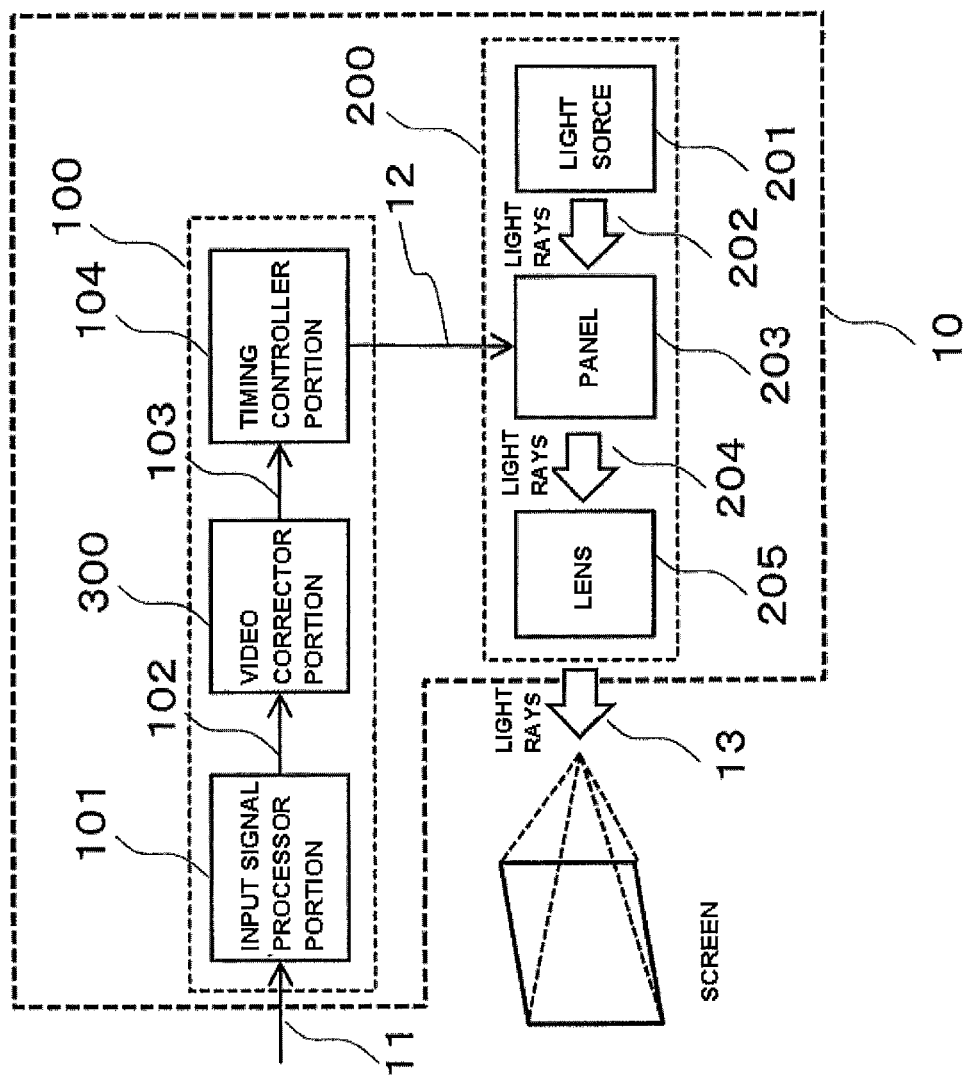
FIG. 1 is a block diagram for showing an example of the structures of a video processing apparatus and a video displaying apparatus, according to the present invention.

Hereinafter, embodiments according to the present invention will be fully explained by referring to the attached drawings. However, the present invention should not be restricted, necessarily, only to those embodiments, and in each drawing for explaining the embodiments given below, the same reference numerals are attached on the same members, thereby omitting the repetitive explanations thereof.

Embodiment 1

In the present embodiment (i.e., a first embodiment), explanation will be given on a video processing apparatus of a small-scaled circuit, on which the Retinex process for increasing the visibility and the resolution restoration (i.e., deconvolution) process can be installed at the same time, and also the video displaying apparatus, in the structure of a liquid crystal display projector, as an example thereof.

FIG. 1 is a block diagram for showing an example of the structure of a liquid crystal display projector (i.e., the video processing apparatus and the video displaying apparatus), according to the present embodiment, and as apparent from the drawing, a video apparatus 10 is constructed with the video processing apparatus 100, for conducting processing of a video signal system while inputting therein a video input signal 11 from airwaves or an output from a PC (e.g., a personal computer), and the video displaying apparatus 200 for conducting processing for an optical system, so as to produce a projection video 13 while inputting a display control signal 12 for controlling the liquid crystal of the liquid crystal display panel.

The video processing apparatus 100 is constructed with an input signal processor portion 101, for converting it into an internal video signal 102 while inputting the video input signal 11 therein, through, for example, a decoder for a compressing video signal, an IP conversion, scaler, or a keystone correction, etc., a video corrector portion 300, for producing a correction video signal 103 for increasing the visibility while inputting the internal video signal 102 therein, and a timing controller portion 104, for producing the display control signal 12 upon basis of horizontal/vertical sync signals of the display screen while inputting the correction video signal 103 therein.

The video displaying apparatus 200 is constructed with a light source 201 for generating light rays 202 therefrom, a liquid crystal display panel 203, for producing a projection picture thereon with adjusting gradation of the light rays 202 from the light source, for each pixel, and a lens 205 for adjusting a focal point of light rays 204 transmitting through the liquid crystal display panel 203.

Figure 2:
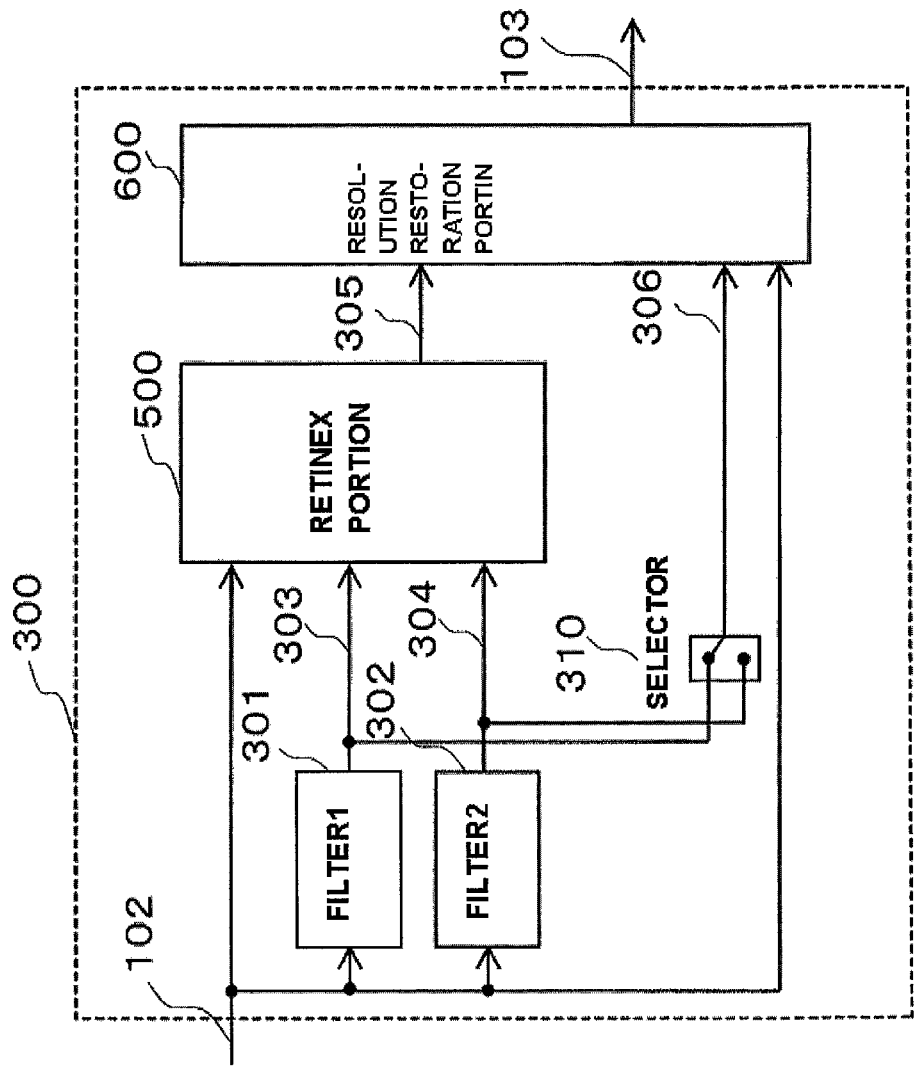
FIG. 2 is a block diagram for showing an example of a video corrector portion in the video processing apparatus, according to an embodiment 1.

FIG. 2 is a view for explaining the video corrector portion 300, in the video processing apparatus according to the present invention.

The video corrector portion 300 has filters of two (2) kinds of scales, i.e., a large one and a small one, and between them, and the filter having the small scale is applied as a filter 1 301, and the filter having the large scale is as a filter 2 302.

Also, this video corrector portion 300 is constructed with a Retinex portion 500 for conducting a local contrast correction through a Retinex theory, while inputting the internal video signal 102, a filter 1 output signal 303 and a filter 2 output signal 304 therein, and thereby producing a Retinex correction signal 305 therefrom, and a resolution restoration (i.e., deconvolution) portion 600 for conducting reduction of diffuse and an improvement of contrast, while inputting the internal video signal 102, the above-mentioned Retinex correction signal 305, and a filter signal 306, which can be obtained through selection of the output signal 303 of the filter 1 or the output signal of the filter 2 by a selector 310.

Following thereto, but before explaining the structure of the Retinex portion 500, explanation will be given on a video correcting process upon basis of the conventional Retinex theory.

In case where the correction is made with targeting a part of brightness areas, upon video including the regions from a low brightness up to a high brightness, through the conventional correction method of contrast, there may be generated a crush of gradation, in any one of the brightness areas other than the target. For example, when taking a picture picking up an image from a bright outdoor to a dark indoor at the same time, the brightness area of the outdoor picture is crushed, in particular, when trying to increase the visibility of an object photographed indoors through the contrast correction.

Then, as a method for dissolving such problem, there are already known technologies for correcting the contrast of the video, locally, and as one of them can be listed up the Retinex theory.

Herein, the Retinex theory is a theory for showing visual characteristics of human eyes, such as, a color homeostasis and a brightness homeostasis, etc. And, in accordance with that theory, it is possible to extract a reflection light component(s), by separating illuminating light components from the picture. Therefore, in accordance with the video correcting process upon basis of the Retinex theory, it is possible to obtain a picture of being high in the visibility thereof, by removing influences of the illuminating light components, being a cause of reason of brining the object to be difficult to see, within that picture, i.e., extracting the reflection light component (s). For this reason, it is possible to compress the picture of a natural dynamic range, which a human can see and feel, even in digital gradations.

Herein, according to the Retinex theory, since the picture "I" can be presented by a product of the illuminating light "L" and the reflectivity "r", it can be described by I=L·r. According to C/S Retinex (Center/Surround Retinex), with an assumption that "L" follows a Gaussian distribution centering an observation pixel within the picture, the reflection light component "R" within a logarithm space is obtained as the difference between the Gaussian distribution and the observation pixel within the logarithm space. Herein, it can be described by the following equation, if assuming that the brightness value of the observation pixel is "I(x,y)" and the Gaussian is "F(x,y)".

$$R(x,y) = \log I(x,y) - \log [F(x,y) \otimes I(x,y)] \qquad \text{Eq. 1}$$

In the Eq. 1, the Gaussian distribution of standard deviation "σ" centering an origin on a two-dimensional space can be described by the following equation. (Herein, the standard deviation will be called "scale", hereinafter, for the purpose of expressing an extent of the Gaussian distribution.)

$$G_{\sigma^2}(x, y) = \frac{1}{2\pi\sigma^2} e^{-\frac{x^2+y^2}{2\sigma^2}} \qquad \text{Eq. 2}$$

Figure 3:
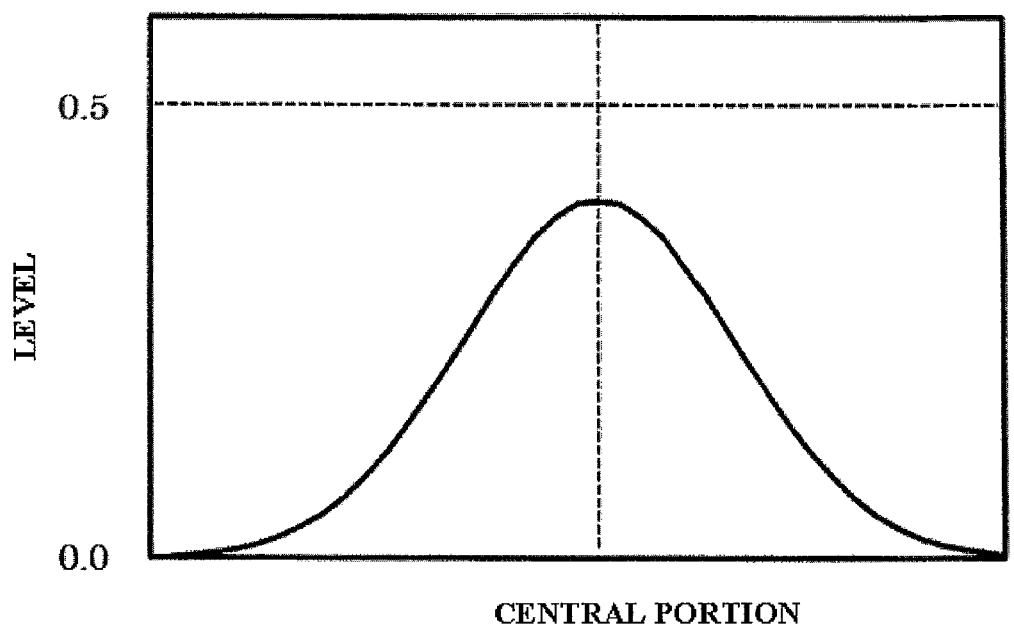
FIG. 3 is a view for explaining a Gaussian distribution.

Also, FIG. 3 is a view, for explaining the Gaussian distribution, which indicates a level of brightness on the vertical axis, while a one-dimensional positional coordinate on the horizontal axis, respectively. In this manner, it can be seen that the level comes to be low as it is far from the center thereof.

Further, the product of "F(x,y)" and "I(x,y)" is called as a convolution product, and it can be expressed by the following equation.

$$f(x, y) \otimes g(x, y) \equiv \int\int_\Omega f(\sigma, \tau) g(x-\sigma, y-\tau) d\sigma d\tau \qquad \text{Eq. 3}$$

$$\approx \sum_{s=-L}^{L} \sum_{t=-L}^{L} f(s, t) g(x-s, y-t)$$

Herein, such a model as the Eq. 1, which can be expressed by one (1) scale, is called SSR (Single Scale Retinex), while a model, which is expressed by a plural number of scalled is called MSR (Multi-Scale Retinex). Now, for MRS having N pieces of scales, if synthetizing or composing the reflection light component of $i^{th}$ SSR by a weight "W", then it can be expressed by the following equation.

$$R_{SSR,i}(x, y) = \log I(x, y) - \log[F_i(x, y) \otimes I(x, y)] \qquad \text{Eq. 4}$$

$$R_{MSR}(x, y) = \sum_{i=1}^{n} W_i R_{SSR,i}(x, y)$$

Next, explanation will be given on the Retinex portion 500, including the Eq. 4 mentioned above, by referring to FIGS. 4 and 2. Hereinafter, for the purpose of simple explanation, consideration will be paid on MSR constructed with two (2) sets of SSR.

Figure 4:
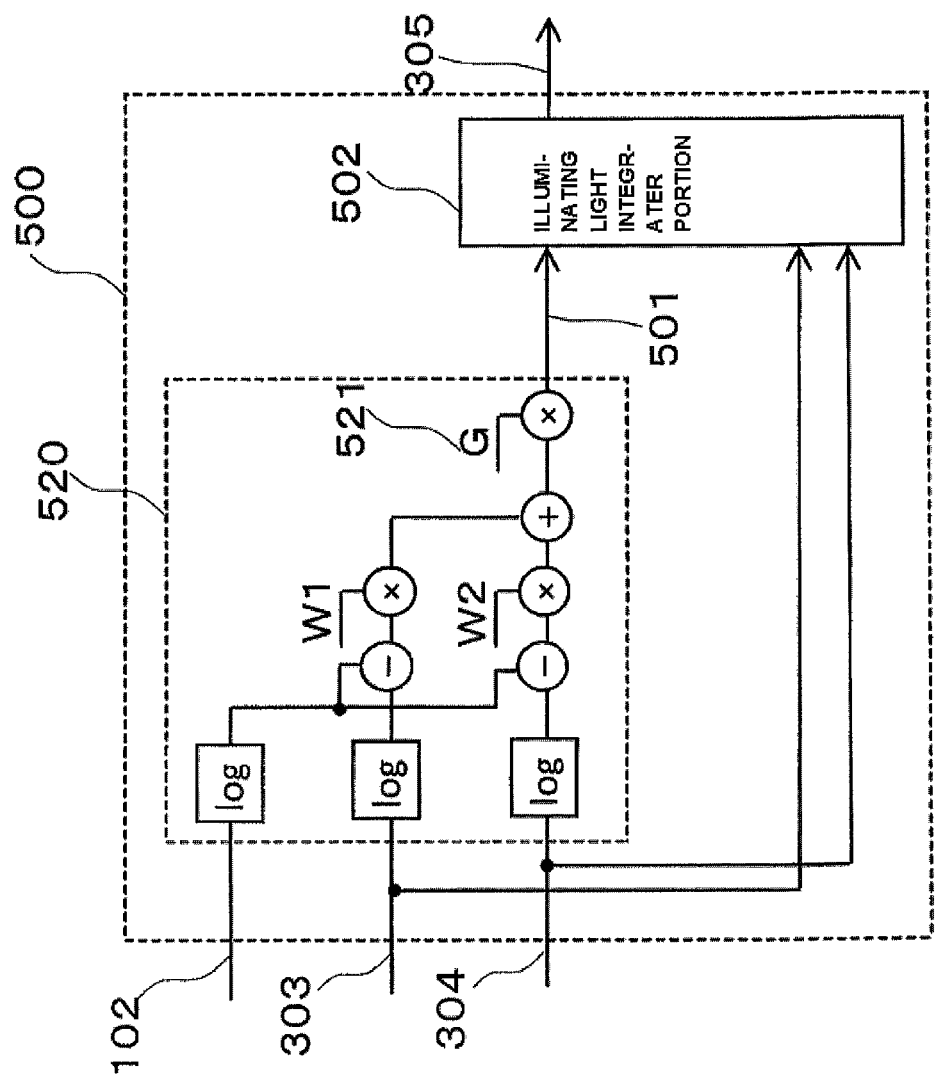
FIG. 4 is a functional block diagram for explaining the processes in a general Retinex portion.

FIG. 4 is a view for explaining the processing of MSR. The Retinex portion 500, inputting the internal video signal 102, the filter 1 output signal 303 and the filter 2 output signal 304 therein, is constructed with a reflection light component producing portion 520, similarly, inputting the internal video signal 102, the filter 1 output signal 303 and the filter 2 output signal 304 therein, and an illuminating light integrator portion 502 for outputting the Retinex correction signal 305, while inputting the reflection light component 501, the filter 1 output signal 303 and the filter 2 output signal 304 therein.

Herein, the filter 1 portion and the filter 2 portion in FIG. 2 mentioned above are the convolution products of the Gaussian distribution and the picture "I" at the scale 1 (i=1) and the scale 2 (i=2), respectively.

Also, the reflection light component producing portion 520 in FIG. 4 has the structure of MSR for two (2) pieces of scales, i.e., adding a gain G521 to the Eq. 4. Also, the illuminating light integrator portion 502 has the structure for integrating the reflectivity obtained through a logarithm conversion of the reflection light component 501, and the illuminating light, i.e., obtaining "L·r". As the structure according to the present embodiment, it may be also the structure of the reflection light component producing portion 520 mentioned above.

Next, explanation will be given on a reflection light component producer portion 550 according to the present invention.

Figure 5:
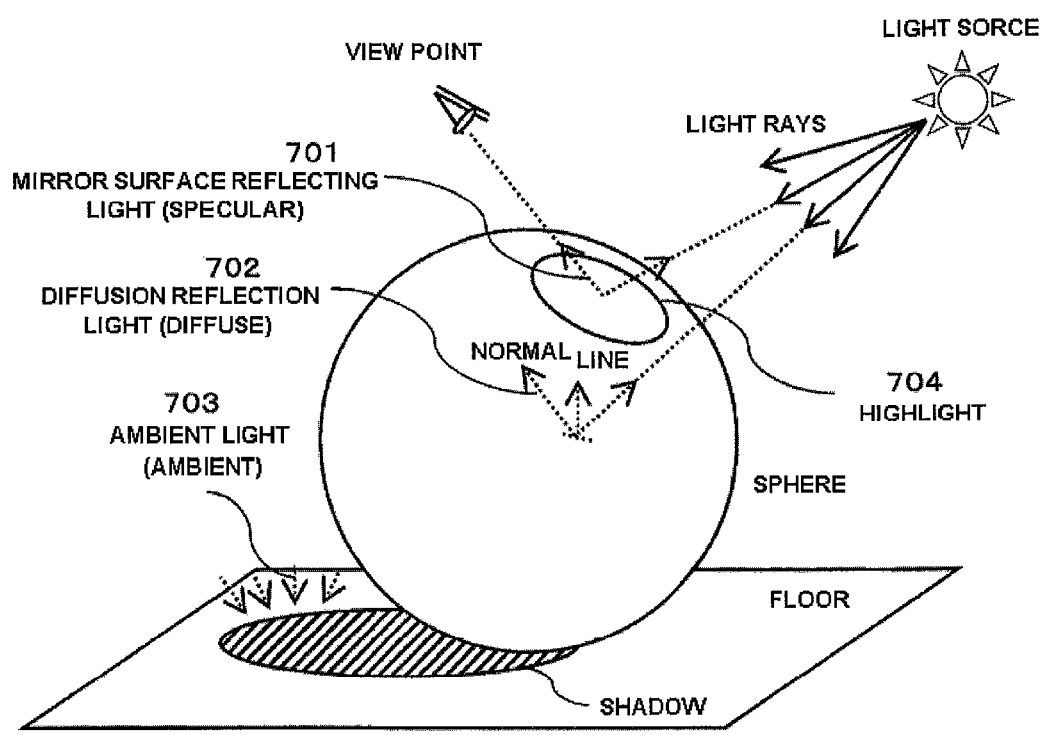
FIG. 5 is a view for explaining the properties of reflection lights by means of Phong reflection model.

FIG. 5 is a view for explaining an example of a Phong reflection model. The model shown in this figure is constructed with a light source, light rays extending from the light source, a sphere, onto which the light rays reach, and a floor mounting the sphere thereon, and an observer for observing this condition. Observation is made at the position of a view point, but it may be made by eyes, actually, or may be made with using observing equipment, such as, a camera, etc.

In this FIG. 5, specular (i.e., a mirror surface reflection light) are the light 701 obtained from the light rays, which are reflecting on a spherical surface in the direction of a line of sight. This is the light source reflecting on the spherical surface, and a circular highlight 704 shown in the figure is a region of the specular. For example, in case of the sphere made of plastic, a small circular highlight having high brightness is generated thereon. Also, in case of the sphere like rubber, for example, a radius of the highlight is widen, but the brightness thereof comes to be low. In this Phong model, it is assumed that the specular depend on a power of a cosine defined by the line of sight and the reflection light.

Also, in this FIG. 5, the diffuse (i.e., the diffusing reflection light) is the light, which is obtained from the light 702 diffusing and reflecting thereon. The brightness of the diffuse can be determined upon the directions of the light rays and the spherical surface, i.e., the cosine defined between the light ray and a normal line, then a portion of the spherical surface, upon which the light hits directly, is a region of the diffuse.

Further, in this FIG. 5, an ambient (i.e., an ambient light) is the light 703, which goes round and cut in a shadow portion. This is the light, reflecting on the periphery thereof by several times, and being diffuses, i.e., being averaged within an entire ambient and accumulated, and then the shadow portion, where the light does not reach, directly, has also a constant brightness. The brightness is determined depending on the light, diffusing and reflecting to be the shadow, the directions of the light ray and the spherical surface, and a light ray vector, i.e., the cosine with respect to the normal line.

From the above, the Phong reflection model can be expressed by the following equation.

$$I = k_d \sum_{j=1}^{l} (\vec{N} \cdot \vec{L}) m_d + k_s \sum_{j=1}^{l} (\vec{R} \cdot \vec{V})^n I_j + I \qquad \text{Eq. 5}$$

Herein, assuming that an input in the reflection light component producer portion is made up with an ambient, a diffuse and specular, then the distribution of the ambient within the picture follows the Gaussian having the wide scale, the distribution of diffuse follows the brightness distribution determined by the cosine with respect to the light ray; however, herein that distribution is approximated to be the Gaussian distribution.

With this, determining that the filter for the ambient is "Fa(x,y)", the filter for the diffuse is "Fd(x,y)", and the filter for the specular is "Fs(x,y)", then each filter comes to be the following equations, respectively.

$$F_a(x, y) = \frac{1}{\sqrt{2\pi}\sigma} e^{-\frac{x^2+y^2}{2\sigma^2}} \qquad \text{Eq. 6}$$

$$F_d(x, y) = \cos\left(\frac{\pi\sqrt{x^2+y^2}}{k}\right) / N \qquad \text{Eq. 7}$$

$$F_s(x, y) = \cos^n\left(\frac{\pi\sqrt{x^2+y^2}}{k}\right) / N^n \qquad \text{Eq. 8}$$

Herein, since an image "Ia" obtained by means of the filter for the ambient is equalized as an entire thereof, then it comes to be that almost made of only the ambient component. An image "Id" obtained by means of the filter for the diffuse, since the specular component thereof is equalized by the filter; then it comes to be that almost made of only the ambient component and the diffuse component. An image "Is" obtained by means of the filter for the specular, since almost not equalized; then all the ambient component, the diffuse component and the specular component thereof are remained. This is expressed by the following Eq. 9.

$$\text{Ambient}=I_a \quad \text{Diffuse}=I_d-I_a \quad \text{Specular}=I_s-I_d \qquad \text{Eq. 9}$$

Obtaining this as the reflection component by means of the logarithm space, in the similar manner to MSR, then it comes to the following Eq. 10.

$$R_{Phong,i}(x, y) = W_d R_{Diffuse,i}(x, y) + W_s R_{Specular,i}(x, y) \qquad \text{Eq. 10}$$

$$R_{Specular,i}(x, y) = \log \bar{I}_{s,i}(x, y) - \log \bar{I}_{d,i}(x, y)$$
$$= \log[F_s(x, y) \otimes I(x, y)] - \log[F_d(x, y) \otimes I(x, y)]$$

$$R_{Diffuse,i}(x, y) = \log \bar{I}_{d,i}(x, y) - \log \bar{I}_{a,i}(x, y)$$
$$= \log[F_d(x, y) \otimes I(x, y)] - \log[F_a(x, y) \otimes I(x, y)]$$

Also, since the specular of the mirror and a metal can be considered to be a total reflection, the power of the cosine comes to be infinity. In this instance, as the reflection component due to the specular may be applied the following Eq. 11.

$$R_{Specular,i}(x, y) = \log I(x, y) - \log[F_d(x, y) \otimes I(x, y)] \qquad \text{Eq. 11}$$
$$= \log I_i(x, y) - \log \bar{I}_{d,i}(x, y)$$

Hereinafter, explanation will be given, by applying the Eq. 11 mentioned above, i.e., assuming that the "Fs(x,y)" is a delta function "δ(x,y)".

Also, in many cases, it is the highlight of high brightness, the specular of which comes be remarkable, but for the diffuse, many have a middle or low brightness. Then, for example, to "Rspecular" of the Eq. 10 mentioned above may be added such a gain of high brightness region, as is shown in FIG. 6A, on the other hand, to the diffuse "Rdiffuse" may be added such a gain of middle or low region, as shown in FIG. 6B.

Figure 6A:
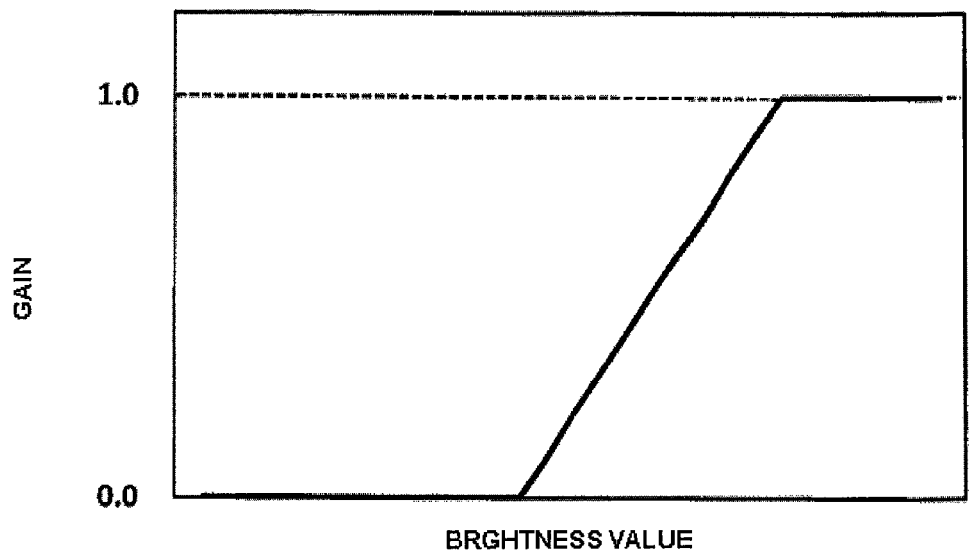
FIGS. 6A and 6B are views for explaining a specular correction gain and a diffuse correction gain depending on a brightness value of a picture.
Figure 6B:
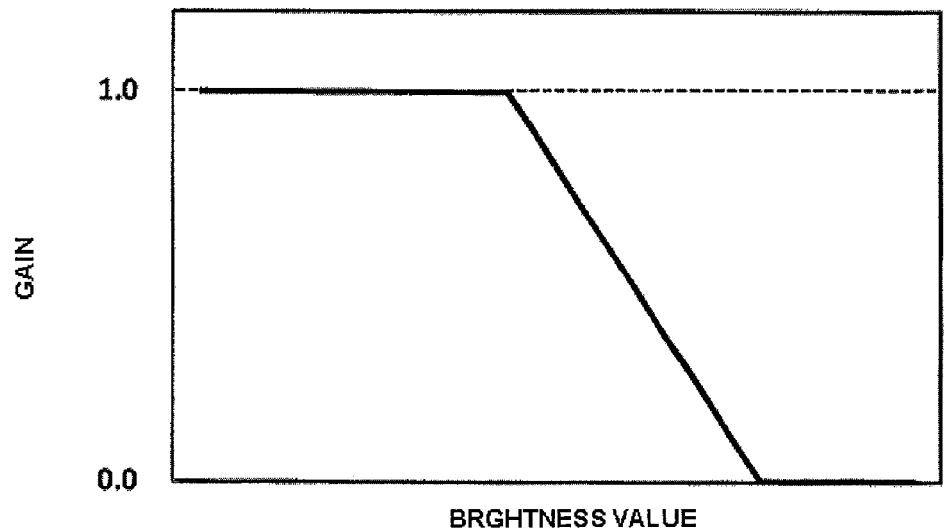

Herein, assuming that an input/output curve shown in FIG. 6A is "g (I)", the gain comes to zero (0) when the input brightness "I" is a low brightness, and the gain increases, gradually, from the middle brightness, and when it goes up to a high brightness, then the gain comes to "1". With an input/output curve shown in FIG. 6B, the gain, i.e., "1−g(I)" comes to "1" when the input brightness is the high brightness, and the gain is "1" at the low brightness, and comes to be low, gradually, from the middle brightness, and the gain is zero (0) at the high brightness.

Also, in similar to the example of the MSR, the above-mentioned Eq. 10 comes to a homomorphism filter, if adding a gain and an exponential function thereto after weighted averaging thereof. For this homomorphism filter, it may be possible to approximate the logarithmic function and the exponential function of the illuminating light integrator portion, by a function applying a power and an inverse function thereof. In this case, if assuming the function to be "f", then it comes to as below.

$$R_{Phong,i}(x, y) = W_d R_{Diffuse,i}(x, y) + W_s R_{Specular,i}(x, y) \qquad \text{Eq. 12}$$

$$R_{Specular,i}(x, y) = f(F_s(x, y) \otimes I(x, y)) - f(F_d(x, y) \otimes I(x, y))$$
$$= f(\bar{I}_{s,i}(x, y)) - f(\bar{I}_{d,i}(x, y))$$

$$R_{Diffuse,i}(x, y) = f(F_d(x, y) \otimes I(x, y)) - f(F_a(x, y) \otimes I(x, y))$$
$$= f(\bar{I}_{d,i}(x, y)) - f(\bar{I}_{a,i}(x, y))$$

From the above, it is possible to make correction with taking the characteristics of reflection into the consideration, with applying the Phong reflection model.

Herein, explanation will be given on the Eq. 12 mentioned above, by referring to FIGS. 7 and 2.

Figure 7:
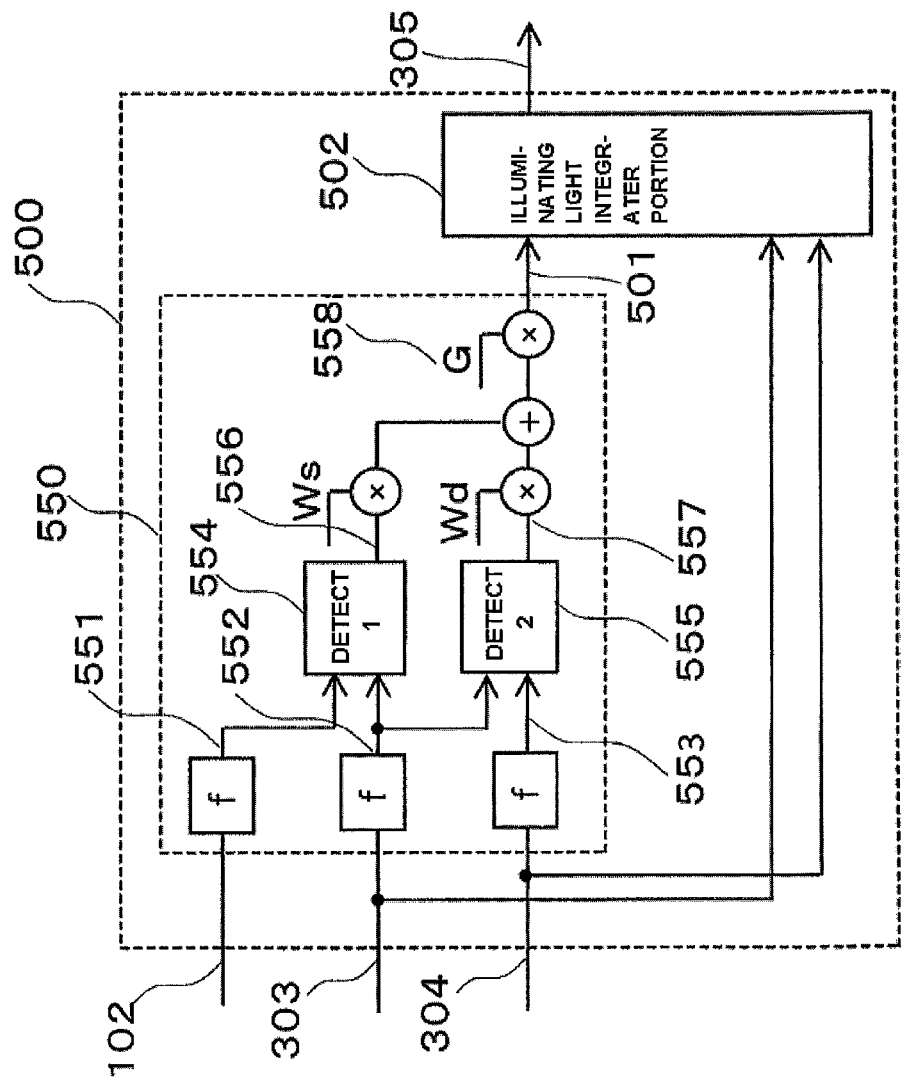
FIG. 7 is a block diagram for explaining the processes in the Retinex portion by means of the Phong reflection model.

FIG. 7 is a view for explaining the processing in the Retinex portion, according to the embodiment 1, wherein the reflection light component producing portion 520 mentioned above is replaced by a reflection light component producing portion 550 in the structure thereof.

In more details, the Retinex portion 500 has the interior video signal 102, the filter 1 output signal 303 and the filter 2 output signal 304, as the input signals thereof, and it is constructed with the reflection light component producing portion 550, similarly, inputting the interior video signal 102, the filter 1 output signal 303 and the filter 2 output signal 304 therein, the reflection light component 501, and the illuminating light integrator portion 502 for outputting the Retinex correction signal 305, while inputting the reflection light component 501, the filter 1 output signal 303 and the filter 2 output signal 304 therein.

Herein, the filter 1 portion and the filter 2 portion shown in FIG. 2 mentioned above are the convolution products of the Gaussian distribution and the video "I" with the scale 1 (i=1) and the scale 2 (i=2), respectively, wherein the filter 1 portion is the distribution by the diffuse and the filter 2 is the distribution by the ambient.

On the other hand, the reflection light component producing portion 550 shown in FIG. 7 has such structure that it adds a gain 558 to Eq. 12 mentioned above, and in the structure thereof, it also includes a detector 1 portion 554 for detecting the specular, while inputting the logarithm distribution 551, being presented by the logarithm function taken from the internal video signal 102 or the power function "f" therein and the logarithm distribution 552 of the diffuse presented by the function "f", and the detector 2 portion 555 for detecting the diffuse, while inputting the logarithm distribution 552 presented by the function "f" and the logarithm distribution 553 of the ambient presented by the function "f", and further includes a sum/product calculator for the specular component 556 and the diffuse component 557, applying weight operators "Ws" and "Wd" therein, and a gain multiplier. Herein, in the detector 1 portion may be included the brightness characteristics, which is shown in FIG. 6B mentioned above.

Also, the illuminating light integrator portion 502 has such structure that it integrates the reflectivity, being obtained by converting the reflection light component 501 by an inverse function of the function "f" (e.g., a logarithm conversion or a power calculation), on other words, obtaining "L·r".

Next, explanation will be given on the resolution restoration portion 600, according to the present invention.

First of all, explanation will be given on a general technology for restoring the picture or imaged degraded due to the diffuse. Now, assuming that the diffuse image to be observed is "I(x,y)", an ideal image "Ir(x,y)", a noise "w(x,y)", and a process of diffuse is "Kt", respectively, then the diffuse image can be expressed by the following Eq. 13. Herein, the process of diffuse mentioned above will be called, "a diffusing process".

$$I(x,y)=K^t I_r(x,y)+w(x,y) \qquad \text{Eq. 13}$$

The degraded (i.e., diffuse) image observed is restored to the ideal image, through inversely tracing the diffusing process of Eq. 13 mentioned above, and as a result thereof, it comes to be that, which can expressed by the following Eq. 14. Herein, the process, i.e., inversely tracing the diffusing process will be called, "an inverse diffusing process".

$$I_r(x,y)=K^{-t}(x,y)-K^t w(x,y) \qquad \text{Eq. 14}$$

In case where the diffusing process follows the Gaussian distribution presented by Eq. 2, the Eq. 13 mentioned above comes to that given below.

$$\begin{aligned} I(x, y) &= K^t I_r(x, y) + w(x, y) \\ &= G_t(x, y) \otimes I_r(x, y) + w(x, y) \end{aligned} \qquad \text{Eq. 15}$$

Here, if conducting Multiscale Decomposition (Q. Li, Y. Yoshida, N. Nakamori, "Multiscale Antidiffusion and Restoration Approach for Gaussian Blurred Images", Proc. IEICE Trans. Fundamentals, 1998) thereon, the Eq. 15 mentioned above is decomposed as can be expressed by the following Eq. 16.

$$\begin{aligned} I_r(x, y) &= G_{\sigma_n^2}(x, y) \otimes I(x, y) + \\ & \nabla^2 G_{\sigma_1^2}(x, y) \otimes I_1(x, y) + \nabla^2 G_{\sigma_2^2}(x, y) \otimes I_2(x, y) + \\ & \ldots + \nabla^2 G_{\sigma_J^2}(x, y) \otimes I_J(x, y) + I_{J+1}(x, y) \\ & (\sigma_1 > \sigma_2 > \ldots > \sigma_J) \\ \nabla^2 G_t(x, y) &= \frac{1}{2\pi t^2}\left(\frac{x^2+y^2}{t} - 2\right)e^{-\frac{x^2+y^2}{2t}} \end{aligned} \qquad \text{Eq. 16}$$

Herein, a second derivative of the Gaussian distribution will be called, "LoG (Laplacian of Gaussian).

Next, it is assumed that the scale follows Eq/17 given below.

$$\sigma_{n+1}=\kappa\sigma_n=\kappa^n\sigma_1 \qquad \text{Eq. 17}$$

Substituting this for Eq. 14 mentioned above, and then the inverse diffusing process comes to be presented by the following Eq. 18

$$\begin{aligned} I_r(x, y) &\approx K^{-t}I(x, y) = G_{\sigma_0^2 - t}(x, y) \otimes I(x, y) + \\ & \nabla^2 G_{\sigma_1^2 - t}(x, y) \otimes I_1(x, y) + \nabla^2 G_{\sigma_2^2 - t}(x, y) \otimes I_2(x, y) + \\ & \ldots + \nabla^2 G_{\sigma_J^2 - t}(x, y) \otimes I_J(x, y) + K^{-t}I_{J+1}(x, y) \end{aligned} \qquad \text{Eq. 18}$$

The above-mentioned is one of the resolution restoration technologies in accordance with the general method. Also, the method for restoring the diffuse image or picture, which is presented by the convolution product, as was mentioned above, will be called, "deconvolution", hereinafter.

Further, explanation will be given on the resolution restoration technology, according to the present invention.

If assuming that the ideal image "Ir" is obtained, in Eq. 18 mentioned above, both sides are an identical equation. Further, a 1$^{st}$ member in an expansion of Eq. 18 mentioned above is the convolution product by means of the Gaussian distribution.

Herein, with respect to that identical equation, if assuming that the observed diffuse image I is the internal video signal 102, the ideal image is the Retinex correction signal 305, the 1$^{st}$ member in the expansion of Eq. 18 mentioned above is the filter signal, and the difference signal between the ideal image "Ir" and the diffuse image is ΔI, respectively, then the Eq. 18 mentioned above can be expressed as Eq. 19 given below.

$$\Delta I = I_r(x, y) - F(x, y) \otimes I(x, y) \approx$$

$$\nabla^2 G_{\sigma_1^2 - t}(x, y) \otimes I_1(x, y) + \nabla^2 G_{\sigma_2^2 - t}(x, y) \otimes I_2(x, y) +$$

$$\ldots + \nabla^2 G_{\sigma_j^2 - t}(x, y) \otimes I_J(x, y) + K^{-1} I_{J+1}(x, y)$$

Eq. 19

With this, the differential signal ΔI comes to a member contributing to the resolution restoration. Also, since it includes the Retinex correction signal therein, the differential signal ΔI contributes to an effect of a local contrast correction, too.

Following to the above, explanation will be given on the resolution restoration portion 600, by referring to FIG. 8.

The resolution restoration portion 600 is constructed with a selector 601, for conducting ON (on a side 306) and OFF (on a side 102) of the resolution restoration function by switching between the filter signal 306 and the internal video signal 102, and an integrator inputting the differential signal 603 between the signal 602, which is selected by the selector, and the Retinex correction signal 306, a gain "G" 604, and the internal video signal 102 therein.

Herein, when the selector 601 is on the side 306, i.e., the resolution restoration function is "ON", the differential signal 603 comes to the Eq. 19 mentioned above, wherein the gain signal 309 adjusts an increase of an approximation equation on the right-hand side, i.e., an intensity of restoration and an intensity of contrast. Also, when the selector 601 is on the side 102, i.e., the resolution restoration function is "OFF", the differential signal 603 tomes to an amount of the Retinex correction, then the gain G 604 adjusts only the intensity of contrast.

Next, explanation will be given on setting up of parameters for controlling the processes of the Retinex and the resolution restoration.

The control of the intensity of the reflection light component in the Retinex process is conducted within a gain (MSR) 521 shown in FIG. 4, in case of the Retinex process by means of MSR, on the other hand, it is conducted within a gain (i.e., a Phong model) 558 shown in FIG. 7, in case of the Retinex process by means of the Phong model.

Also, an adjustment on correction band in the Retinex process is conducted with weights "W1" and "W2", in case of the Retinex process by means of MSR, on the other hand, with weights "Ws" and "Wd", in case of the Retinex process by means of the Phong model.

Figure 8:
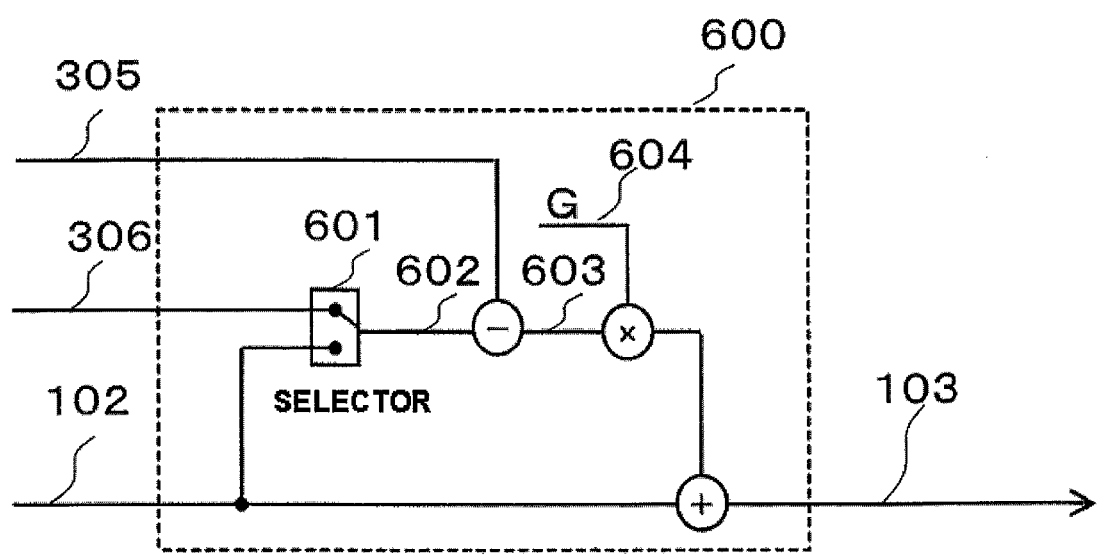
FIG. 8 is a functional block diagram for explaining a resolution restoration portion in the video processing apparatus according to the embodiment 1.

The control in the resolution restoration process is conducted with a fin 604, accompanying with the Retinex correction intensity, in case where the selector 601 shown in FIG. 8 is "ON" (i.e., on the side 306) of the resolution restoration function. On the other hand, in case where it is "OFF" (i.e., on the side 102) of the resolution restoration function, the control is made only on the Retinex correction intensity.

An adjustment of band of the correction effect within the resolution restoration process is conducted by the selector 310 shown in FIG. 2. For example, if the Retinex process is MSR by means of "N" pieces of scales, for example, then a number of the inputs to the selector (i.e., a multiplexer) is "N", therefore selection can be made from among of "N" pieces of bands.

Further, the setting up of the gain mentioned above may be made by inputting a numeral, directly, through OSD, etc., for example, or may be made with using a 10-stage lever. The setting up of the selector may be made by changing a lever while displaying "ON" or "OFF", for example. The setting up of the weight may be made by selecting one among from several numbers of items prepared in advance, for example.

Also, such setting up as mentioned above may be changed, depending on a kind of the input video signal, such as, DVD (SD), BD (Full HD), an airwave, or a PC, etc.

Thus, with such structure as mentioned above, it is possible to provide the video processing apparatus in the form of the small scaled circuit, for enabling an implementation of the Retinex process for improving the visibility, and the deconvolution process as well, at the same time.

Embodiment 2

In the embodiment 1 given in the above is given the explanation on the video processing apparatus in the form of the small scaled circuit, for enabling the implementation of the Retinex process for improving the visibility, and the resolution restoration (i.e., the deconvolution) process, as well, at the same time, and the video displaying apparatus, as one example thereof. Herein, in the present embodiment 2, explanation will be given on the video processing apparatus for suppressing the diffuse and degradation of contrast by means of the keystone correction, applying the embodiment 1 mentioned above therein.

The structure of the video processing apparatus and the video displaying apparatus, according to the present embodiment 2, is same to that shown in FIG. 1 mentioned above, and therefore the detailed explanation thereof will be omitted. Further, the present video apparatus 10 is constructed with the video processing apparatus 100 for conducting video signal system processing, while inputting a video input signal 11, being extracted from the airwave or outputted from the PC, and the video displaying apparatus 200 for conducting optical system processing for producing a projection video 13, while inputting a display control signal for controlling the liquid crystal of the liquid crystal display panel.

Figure 9:
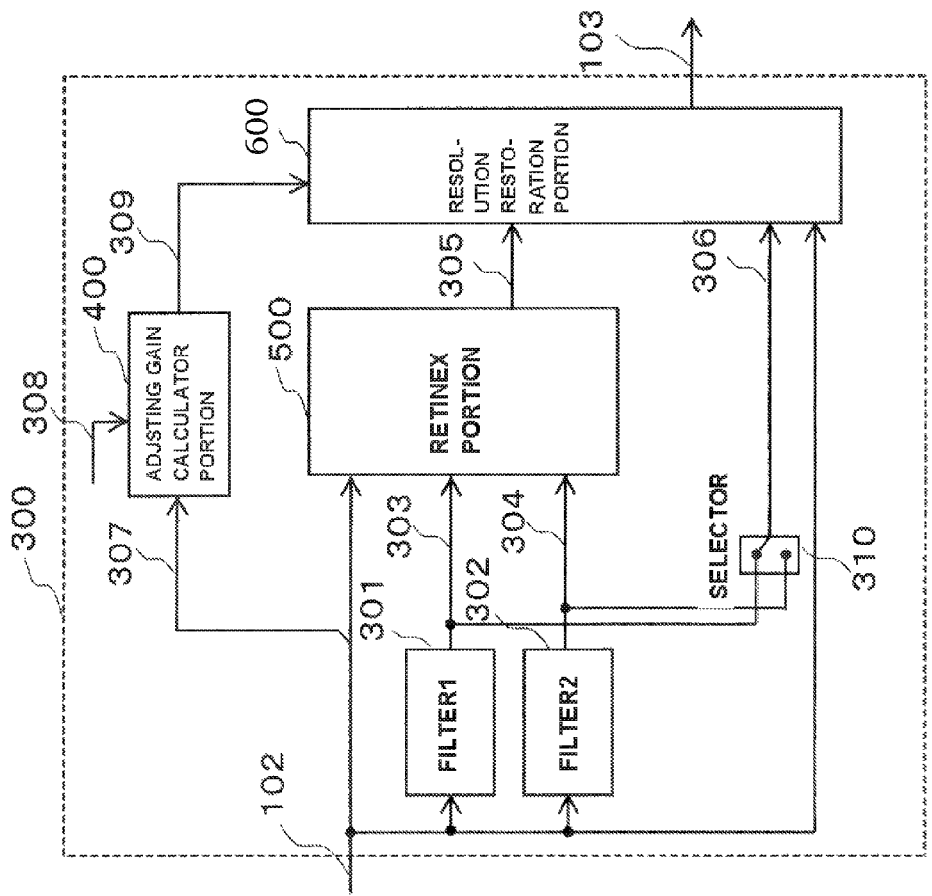
FIG. 9 is a block diagram for explaining an example of the a video corrector portion in the video processing apparatus according to an embodiment 2.

FIG. 9 is a view for explaining a video corrector portion 300 of the video processing apparatus, and has the structure of adding an adjusting a gain calculating portion into that of the embodiment 1 mentioned above, which is shown in FIG. 2, and will be explained hereinafter.

The video corrector portion 300 has two (2) kinds of filters, i.e., a large scale one and a small scale one, and between them, the small scale filter is adopted as a filter 1 portion 301, while the large scale filter as a filter 2 portion 302, respectively.

Also, the video corrector portion 300 is constructed with a Retinex portion 500 for conducting the local contrast correction in accordance with the Retinex theory, while inputting the internal video signal 102, the filter 1 output signal 303 and the filter 2 output signal 304 therein, an adjusting gain calculator portion 400 for calculating the contrast and an intensity of resolution restoration, while inputting an address signal 307 for indicating the coordinate position of the video, which is extracted from the internal video signal 102, and a horizontal/vertical correction volume 308 for the keystone correction, and a resolution restoration (deconvolution) portion 600 for conducting a reduction of diffuse and an improvement of contract, depending on the gain, while inputting the internal video signal 102, the Retinex correction signal 305 outputted from the Retinex portion, the filter signal 306, which is selected to the filter 1 output signal 303 or the filter 2 output signal 304 at the selector 310, and the gain signal 309 outputted from the adjusting gain calculating portion therein.

Also, the structure of the Retinex portion 500, as the structure according to the present embodiment 2, it may be built up with the reflection light component producing portion 520 shown in FIG. 4 mentioned above, with which the explanation was made on the MSR, or may be built up with the reflection light component producer portion 550 shown in FIG. 7 mentioned above, with which the explanation was made on the Phong reflection model.

Figure 10:
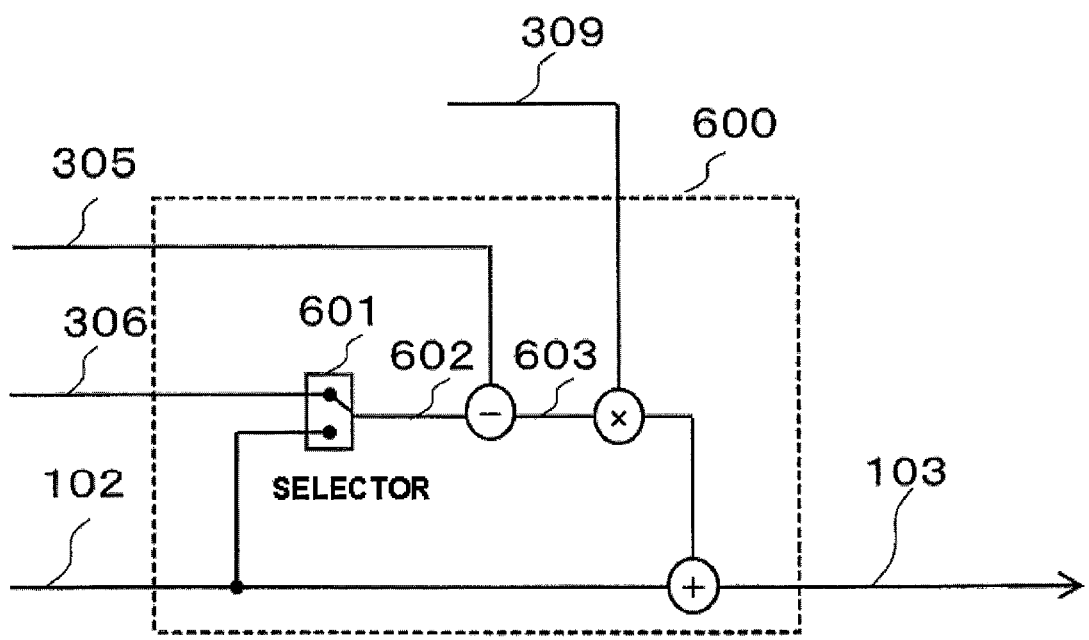
FIG. 10 is a functional block diagram for explaining a resolution restoration portion according to the embodiment 2.

Next, explanation will be given on the resolution restoration portion 600, according to the present embodiment 2, by referring to FIG. 10.

The resolution restoration portion 600 is constructed with a selector 601 for switching "ON" (on side 306) or "OFF" (on side 102) of the resolution restoration function, by exchanging between the filter signal 306 and the internal video signal 102, and an integrator, inputting a differential signal between the signal 602 selected by the selector and the Retinex correction signal 306, the gain signal 309, and the internal video signal 102 therein.

Herein, in case where the selector 601 is on the side 306, i.e., the resolution restoration is "ON", the differential signal 603 comes to the Eq. 19 mentioned above; i.e., the gain signal 309 adjust an increase of the expansion on the right-hand side, e.g., the intensity of restoration and the intensity of contrast. Also, in case where the selector 601 is on the side 102, i.e., the resolution restoration is "OFF", the differential signal 603 comes to the Retinex correction volume; i.e., the gain signal 309 adjusts only the intensity of contrast.

Next, explanation will be given on the adjusting gain calculator portion 400 according to the present embodiment 2.

First of all, explanation will be given on a problem(s) relating with the keystone correction, by referring to FIGS. 11A to 11C and FIGS. 12A and 12B.

Figure 11A:
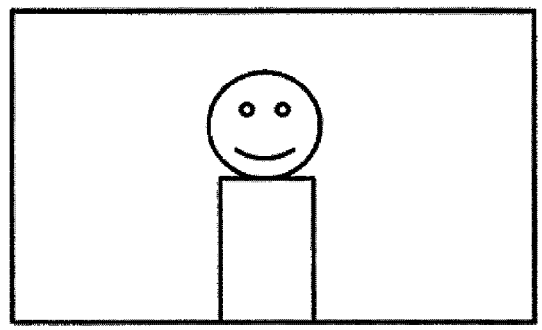
FIGS. 11A to 11C are views for explaining an internal video signal of a projector, a picture being projected on a plane vertical to an optical axis of the projector, and a picture being projected by adding an angle of elevation to the optical axis of the projector.
Figure 11B:
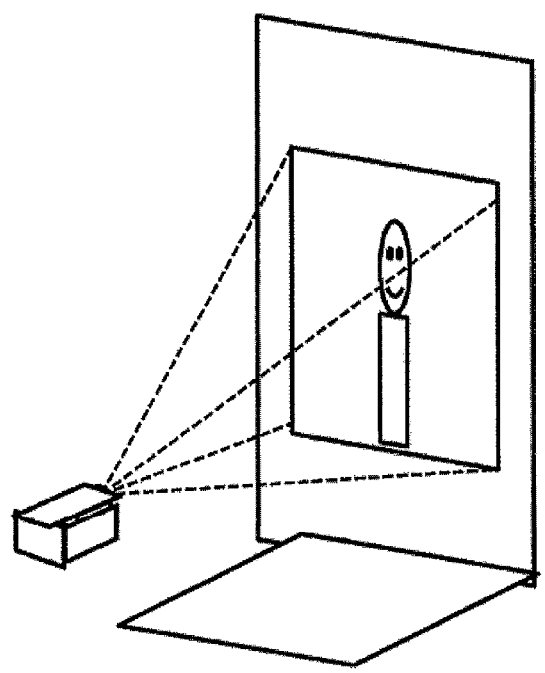
Figure 11C:
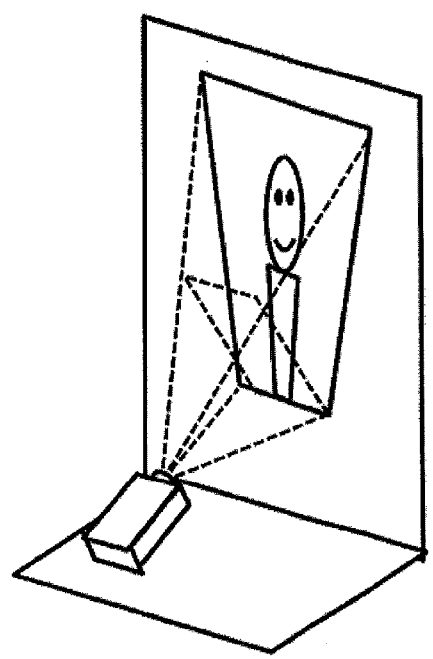

FIG. 11A is a view for explaining the internal video signal 102 of the projector. The picture obtained by projecting that internal video signal on a plane vertical to an optical axis is shown in FIG. 11B. In this case, the picture projected is protected in the form of a rectangle, similar to that internal video signal. Following to the above, FIG. 11C is a view for explaining the picture, which is obtained by projecting that internal video signal, with adding an angle of elevation to the optical axis of the projector. In this instance, it comes to a picture, an upper portion thereof being widen, in the form of a trapezoid, and expanding above.

Then, reduction or shrinkage in made on that internal video signal, in the vertical direction thereof, and also geometrical conversion is made thereon into the trapezoid picture inverse to the projection surface. This correction is called, a trapezoidal correction or the keystone correction.

Figure 12A:
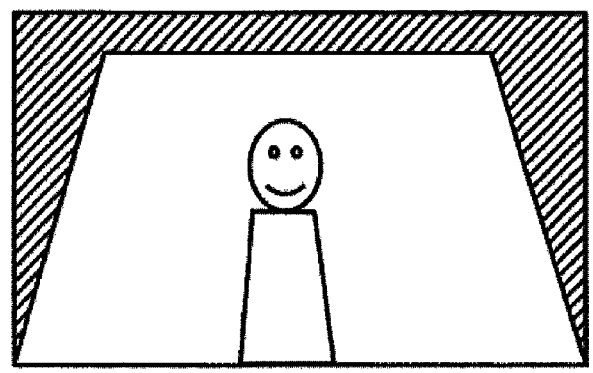
FIGS. 12A and 12B are views for explaining the internal video signal of the projector, upon which a trapezoidal distortion correction is made, and a picture being projected by applying the trapezoidal distortion correction into the projector.
Figure 12B:
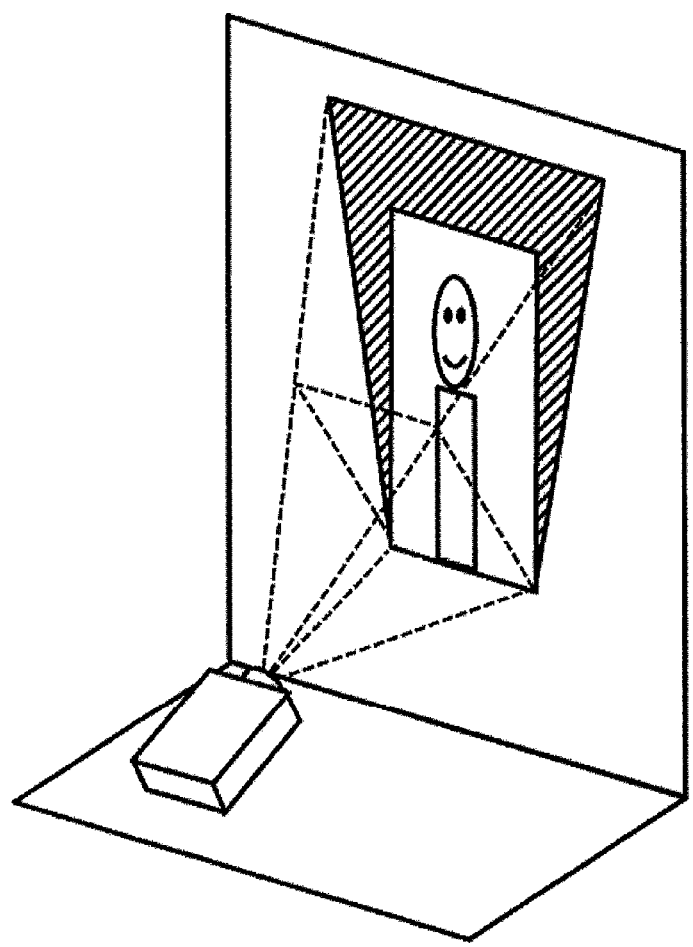

FIG. 12A is a view for explaining the internal video signal, on which the trapezoidal correction is processed. The picture obtained by projecting that internal video signal, with adding the angle of elevation to the optical axis of the projector, is shown in FIG. 12B. Herein, a slanting line area or region at an end of the video shown in FIG. 12A is back in the color thereof. In the projector, since the black color has zero (0) brightness, therefore, ideally, that region is an area or region where no light is projected. Therefore, as is shown in FIG. 12B, the picture being projected can be displayed as the correct rectangular picture.

Following to the above, explanation will be given a problem(s) due to the keystone correction, by referring to FIGS. 13A and 13B and FIGS. 14A and 14B.

Figure 13A:
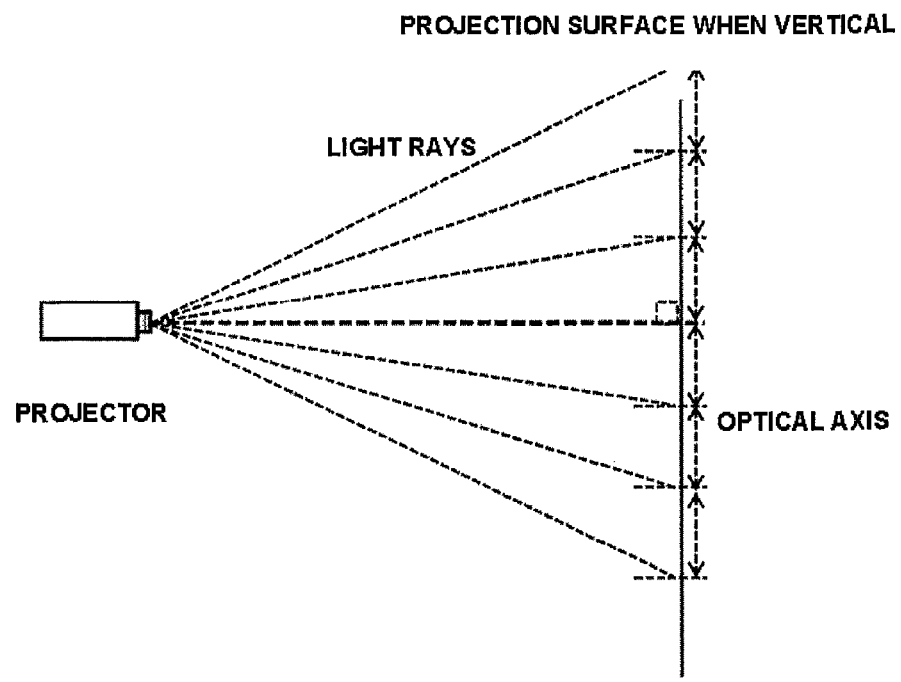
FIGS. 13A and 13B are views for explaining light rays when they are projected in a plane vertical to the optical axis of the projector, and light rays when they are projected by adding the angle of elevation to the optical axis of the projector.
Figure 13B:
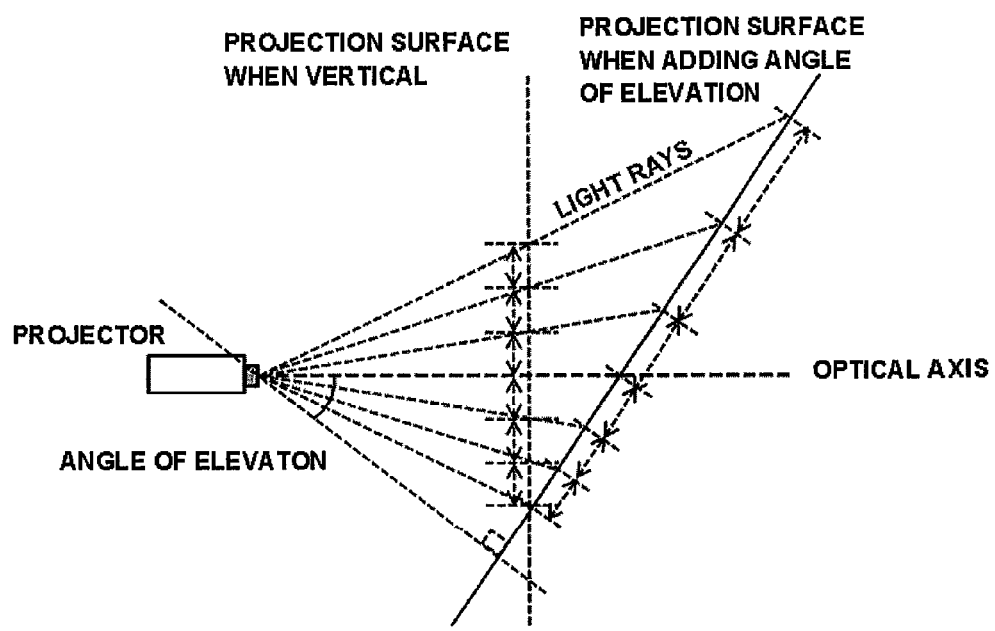

FIG. 13A is a view for explaining about the light rays where the projector makes projection onto a plane vertical to the optical axis thereof. As is shown in those figures, it is assumed that the light rays are projected, preferably, in case where the projection is vertical to the plane. FIG. 13B is a view for explaining about the light rays when the projection is made by adding the angle of elevation. As is shown in that figure, on the projection surface where the angle of elevation is added, it can be seen that a gap between the light rays is widen as it goes up.

Next, consideration will be paid on a contour picture in an area or region, roughly being divided into two (2) colors.

Figure 14A:
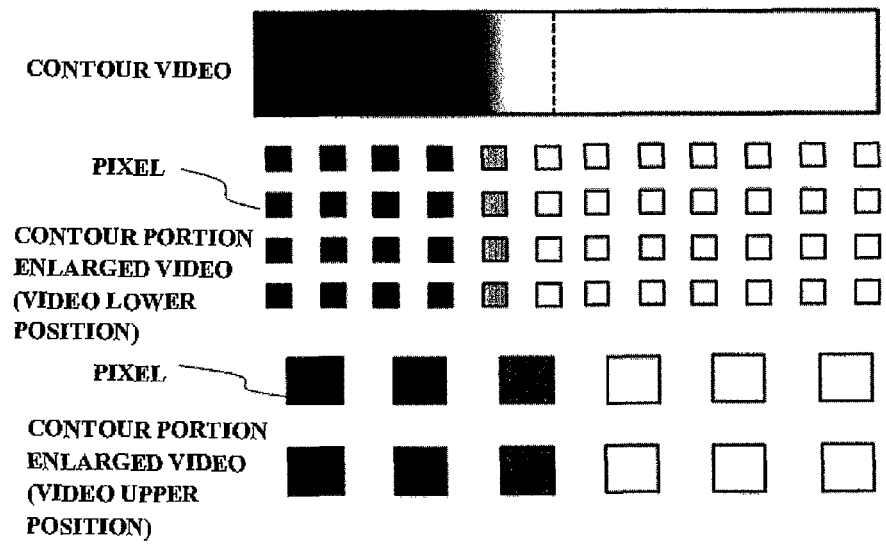
FIGS. 14A and 14B are views for explaining pixels of a contour video when being projected by adding the angle of elevation, and the brightness of the contour video when being projected by adding the angle of elevation.

FIG. 14A is a view for explaining about the difference of pixels, between contour portion expanding pictures in an upper portion and a lower portion of the picture, when the projector makes projection with adding the angle of elevation to the optical axis thereof. In this manner, since a number of the pixels per an area decrease down to be small, in the upper portion of the picture, then the resolution is lowered down, thereby generating the diffuse on the picture.

Figure 14B:
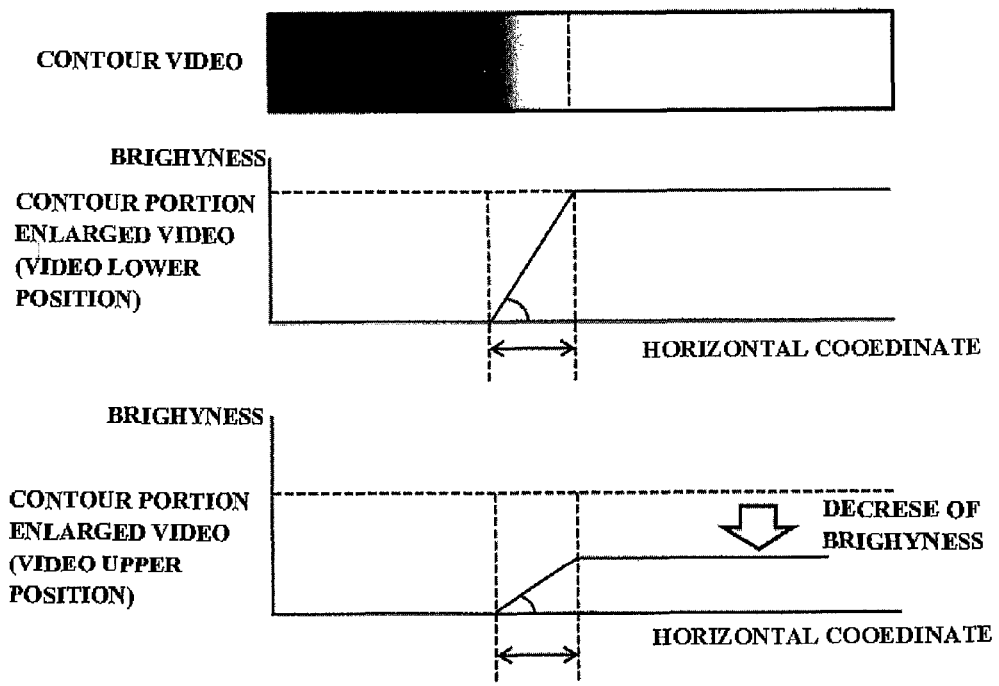

FIG. 14B is a view for explaining the brightness characteristics of a contour portion in the lower portion and the upper portion of the picture, when the projector makes projection with adding the angle of elevation to the optical axis thereof. In this manner, since the light fluxes per an area are reduced in the upper portion of the picture, the brightness is lowered down, and also, since an inclination comes to be loose at the contour, therefore the contrast and the high-definition come down to be low.

That mentioned in the above is the problem causing in the keystone correction.

Next, explanation will be given on a method for calculating the gain in the adjusting gain calculator portion 400, by referring to FIGS. 15A and 15B.

Figure 15A:
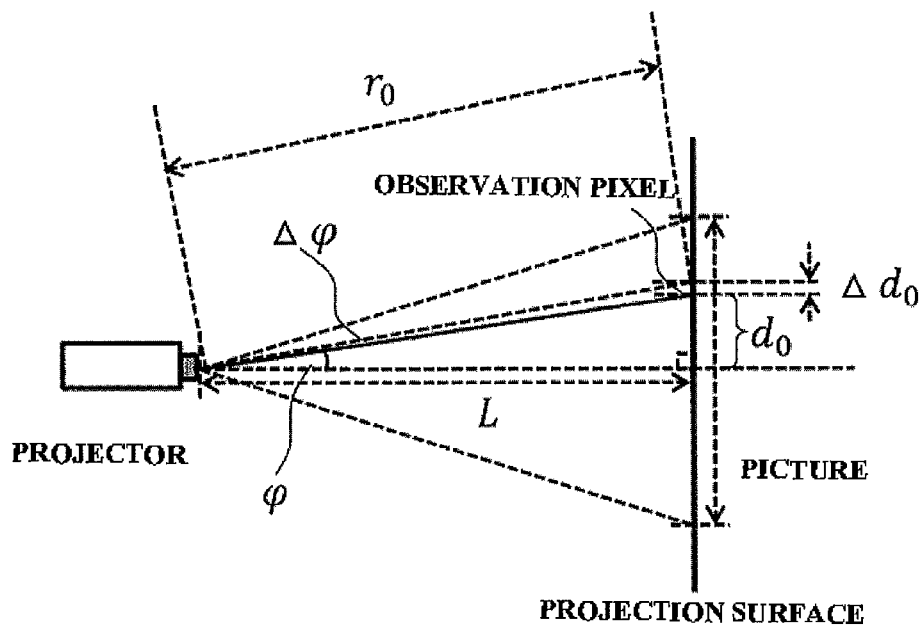
FIGS. 15A and 15B are views for explaining pixel positions and a difference thereof when being projected on the plane vertical to the optical axis, and pixel positions and a difference thereof when being projected by adding the angle of elevation to the optical axis.

FIG. 15A is a view for showing an example of an example of the gain calculating method, for dissolving the problem in the keystone correction mentioned above, and is that, in particular, for explaining about the pixel positions and a difference between those, when the projection is made on the plane vertical to the optical axis. In this FIG. 15A, it is assumed that the distance between the projector and the projection surface is "L", the distance between the projector and an observation pixel irradiated on the projection surface is "r0", an angle defined by the light ray onto the observation pixel and the optical axis is "φ", height is "d0", an angle defined by the light rays onto the observation pixel and a pixel laying above that by one (1) pixel is "Δφ", and the difference of height is "Δd0", respectively. In this instance, "d0", "Δd0" and "r0" come to those given by Eq. 20, below.

$$d_0 = L \tan(\phi)$$

$$\Delta d_0 = L\{\tan(\phi + \Delta\phi) - \tan(\phi)\}$$

$$r_0 = \sqrt{L^2 + d_0^2} = L\sqrt{1 + \tan^2(\phi)} \qquad \text{Eq. 20}$$

Figure 15B:
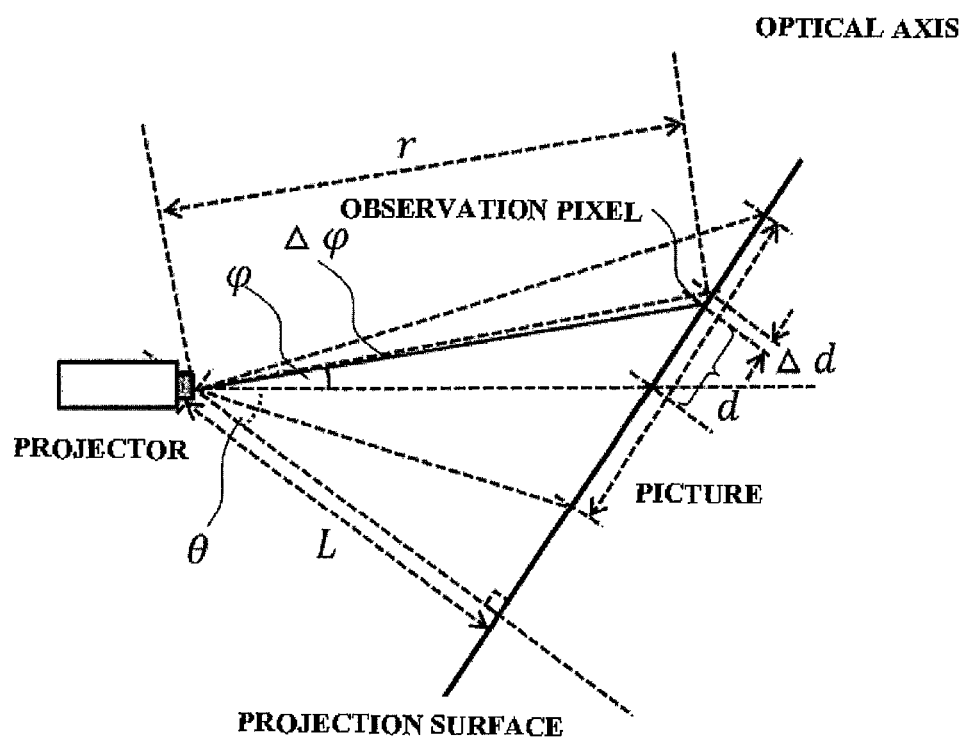
Figure 16:
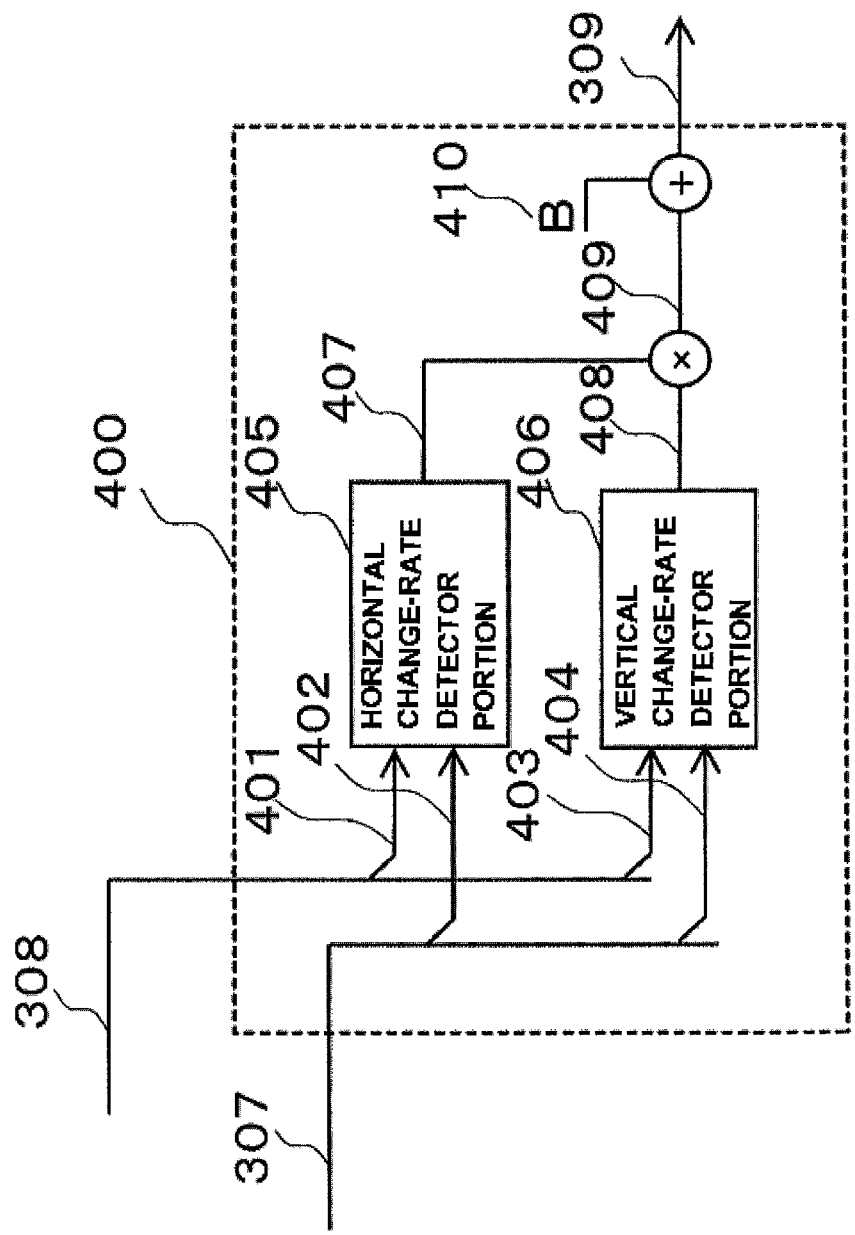
FIG. 16 is a functional block diagram for explaining an adjustment gain calculator portion in the embodiment 2.

Next, FIG. 15B is a view for showing an example of an example of the gain calculating method, for dissolving the problem in the keystone correction mentioned above, and is that, in particular, for explaining about the pixel positions and a difference between those, when the projection is made by adding the angle of elevation to the optical axis. In this FIG. 15B, it is assumed that the distance between the projector and the projection surface is "L", the angle of elevation is "θ", the distance between the projector and the observation pixel irradiated on the projection surface is "r", an angle defined by the light ray onto the observation pixel and the optical axis is "φ", height is "d", an angle defined by the light rays onto the observation pixel, and a pixel laying above that by one (1) pixel is "Δφ", and the difference of height is "Δd", respectively. In this instance, "d", "Δd" and "r" come to those given by Eq. 20, below.

$$d = L\tan(\theta + \varphi)$$

$$\Delta d = L\{\tan(\theta + \varphi + \Delta\varphi) - \tan(\theta + \varphi)\}$$

$$r = \sqrt{L^2 + d^2} = L\sqrt{1 + \tan^2(\theta + \varphi)} \quad \text{Eq. 21}$$

Herein, since brightness and a ration of expansion depend on a ratio between the areas before and after adding the angle of elevation, therefore the consideration will be given on a rate of changing between the areas at the observation pixel positions, shown in FIGS. 15A and 15B.

Now, the ratio of "Δd" to "Δd0" comes to Eq. 22 given below, and the changing rate in the vertical direction can be obtained at the observation pixel position.

$$\alpha(\theta, \varphi) = \frac{\Delta d}{\Delta d_0} = \frac{L\Delta\varphi \cdot \sec^2(\theta + \varphi)}{L\Delta\varphi \cdot \sec^2(\varphi)} = \frac{\sec^2(\theta + \varphi)}{\sec^2(\varphi)} \quad \text{Eq. 22}$$

Next, the changing rate in the horizontal direction has no change in the horizontal angle component thereof, but since it is in proportion to the distance of the observation pixel, therefore, if obtaining a ratio of "r" to "r0", it comes to Eq. 23, given below.

$$\beta'(\theta, \varphi) = \frac{r}{r_0} = \sqrt{\frac{1 + \tan^2(\theta + \varphi)}{1 + \tan^2(\theta)}} \quad \text{Eq. 23}$$

Herein, when the projection is made on the plane vertical to the optical axis, this comes to Eq. 24 given below, if assuming that there is no change of the changing rate in the horizontal direction.

$$\beta(\theta, \varphi) = \beta'(\theta, \varphi)\frac{1}{\sqrt{1 + \tan^2(\varphi)}} = \sqrt{\frac{1 + \tan^2(\theta + \varphi)}{(1 + \tan^2(\theta))(1 + \tan^2(\varphi))}} \quad \text{Eq. 24}$$

With this, the changing rate of area when the angle of elevation is added to, comes to the product of the changing rate in the vertical direction and the changing rate in the horizontal direction; i.e., it comes to Eq. 25 given below.

$$\text{ratio} = \alpha(\theta, \varphi)\beta(\theta, \varphi) \quad \text{Eq. 25}$$
$$= \frac{\sec^2(\theta + \varphi)}{\sec^2(\varphi)}\sqrt{\frac{1 + \tan^2(\theta + \varphi)}{(1 + \tan^2(\theta))(1 + \tan^2(\varphi))}}$$

Further, if there is shifting of angle in the horizontal direction, in other words, in case of adding a n azimuth angle, also the same designing can be applied. Then, if assuming that the azimuth angle defined between the projector and the optical axis is "θh", the angle of elevation is "θv", an angle defined between the observation pixel is "φh" in the horizontal direction and is "φv" in the vertical direction, respectively, the ratio comes to Eq. 26 given below, i.e., the ratio of areas can be obtained.

$$\text{ratio} = \alpha(\theta_h, \varphi_h)\beta(\theta_h, \varphi_h)\alpha(\theta_v, \varphi_v)\beta(\theta_v, \varphi_v) \quad \text{Eq. 26}$$

Explanation will be given on the adjusting gain calculator portion 400, by referring to FIG. 7.

The adjusting gain calculator portion 400 is constructed with a horizontal changing rate calculator portion 405 for calculating a horizontal changing rate 407, while inputting the horizontal correction volume 401 extracted from the horizontal/vertical correction volume 308, and the horizontal coordinate position 402 extracted from the address signal 307, a vertical changing rate calculator portion 406 for calculating a vertical changing rate 408, while inputting the vertical correction volume 403 extracted from the horizontal/vertical correction volume 308, and the vertical coordinate position 404 extracted from the address signal 307, and a multiplier for obtaining an area changing rate 409 through multiplication between the horizontal changing rate 407 and the vertical changing rate 408. Also, the present adjusting gain calculator portion 400 may have a setup value same to the gain 604 of the embodiment 1 mentioned above, even in the case where no keystone correction is made, i.e., an offset B 410, for adding a correcting effect caused due to the local contrast correction and the resolution restoration, may be added thereto.

Herein, the horizontal/vertical correction volume 308 is a correction volume relating to the fact that the azimuth angle between the optical axis of the projector is "θh" and the angle of elevation is "θv", and the method for calculating the ratio of areas is the Eq. 26, which is given in the above.

In the above is given a one example of the method for calculating the gain, but the method for obtaining the changing rate of the area should not restricted to the present method.

With the structure given in the above, it is possible to provide the video processing apparatus, for enabling to implement the Retinex process and the deconvolution process, at the same time, thereby improving the visibility, in the form of a small-scale circuit, and also there is provided the video displaying apparatus for suppressing the diffuse and lowering of the contrast, preferably, with applying that video processing apparatus therein, in the geometric conversion by means of the keystone correction.

However, the embodiments mentioned above are explained in the details thereof, for easy understanding of the present invention, and therefore, the present invention should not be restricted to those embodiments mentioned above; but may includes various variations thereof, and for example, it should not be limited, necessarily, only to that having all of the constituent elements explained in the above. Also, it is possible to add the constituent element(s) of other embodiment(s) to the constituent elements of a certain embodiment. Further, to/from/for a part of the constituent elements of each embodiment can be added/deleted/substituted other constituent element(s).

Also, each of the constituent elements, the functions and the processes mentioned above can be accomplished, in a part or a whole thereof, by hardware, obtained by designing it/them in the form of an integrated circuit, etc., for example. Also, each of the constituent elements and functions, etc., mentioned above can be accomplished by a program, in which a processor interprets a program(s) for achieving the respective functions and executes it/them. The information, such as, a program, a table and a file, etc., for achieving each function, can be positioned on a recording device, such as, a hard disk, a SSD (Solid State Drive), etc., or on recording medium, such as, an IC card, a SD card, or a DVD, etc.

What is claimed is:

1. A video processing apparatus, comprising:
an input portion, which is configured to input a video signal therein; and
a video correcting portion, which is configured to correct said input video signal,
wherein said video correcting portion is constructed to conduct a part of a Retinex process and a part of resolution restoration (deconvolution) by a circuit for common use,
wherein said Retinex process is conducted upon basis of a result of calculation, applying a first output obtained by applying a mirror reflection component (specular) filter onto the input video signal, a second output obtained by applying a diffuse reflection component (diffuse component) filter onto the input video signal, and a third output obtained by applying an ambient light component (ambient component) filter onto the input video signal, in the structure thereof, and
wherein said resolution restoration (deconvolution) is conducted by a calculating process upon basis of at least said first output or said second output.

2. The video processing apparatus, as described in the claim 1, wherein the ambient light component in said Retinex process is a convolution product of a normal distribution.

3. The video processing apparatus, as described in the claim 1, wherein a picture, including the diffuse reflection component and the ambient light component within said Retinex process, is obtained from a brightness distribution by cosine, and a component obtained by subtracting the ambient light component from said brightness distribution by cosine is the diffuse reflection component.

4. The video processing apparatus, as described in the claim 1, wherein a picture, including the mirror surface reflection component, diffuse reflection component and the and the ambient light component within said Retinex process, is a brightness distribution by a power of cosine, and a component obtained by subtracting the brightness distribution by cosine from said brightness distribution by the power of cosine is the mirror surface reflection component.

5. The video processing apparatus, as described in the claim 1, wherein a picture, including the mirror surface reflection component, diffuse reflection component and the and the ambient light component within said Retinex process, is as brightness value of an observation pixel.

6. The video processing apparatus, as described in the claim 1, wherein said reflection light separated in said Retinex process is converted into a logarithm.

7. The video processing apparatus, as described in the claim 1, wherein said reflection light separated in said Retinex process is powered.

8. A video processing apparatus, comprising:
an input portion, which is configured to input a video signal therein; and
a video correcting portion, which is configured to correct said input video signal,
wherein said video correcting portion is constructed to conduct a part of a Retinex process and a part of resolution restoration (deconvolution) by a circuit for common use,
wherein the deconvolution process is a decomposed picture, applying a Gaussian distribution obtained by plural numbers of standard deviations therein, and
wherein said deconvolution process is conducted under a condition that the picture (diffuse picture) observed in a diffusing process is an original picture, and that an ideal picture is a picture after the Retinex process, and one or plural numbers of convolution processes by the Gaussian distribution of the Retinex is a part of said decomposed picture.

9. A projector apparatus, comprising:
a light source;
a video processing apparatus which is configured to have an input portion to input a video signal, and to have a video correcting portion to correct said input video signal, wherein said video correcting portion is constructed to conduct a part of a Retinex process and a part of resolution restoration (deconvolution) by a circuit for common use;
a video displaying apparatus, which is configured to produce and project a picture upon basis of a display control signal from said video processing apparatus, wherein
correction intensities in said Retinex process and said deconvolution process are adjusted, depending on a video geometric conversion made by a keystone correction by said projector.

10. The projector apparatus, as described in the claim 9, wherein
an intensity of said correction for conducting an adjustment depending on the video geometric conversion by said keystone correction is changed based on a changing rate of area at a position of a pixel, between before and after being projected by said projecting apparatus, in said Retinex process and said deconvolution process.

11. The projector apparatus, as described in the claim 9, wherein
calculation of said changing rate of area for conducting the adjustment depending on the video geometric conversion by said keystone correction is conducted by based on a setup of horizontal and vertical parameters of said keystone correction, in said Retinex process and said deconvolution process.

* * * * *